United States Patent
Cao

(10) Patent No.: US 10,602,719 B2
(45) Date of Patent: Mar. 31, 2020

(54) ANIMATED SQUEAKY PET TOY AND METHOD FOR PRODUCING A SQUEAKY NOISE

(71) Applicant: Bencoo, Inc., Walnut, CA (US)

(72) Inventor: Jennifer Yiruo Cao, Walnut, CA (US)

( * ) Notice: Subject to any disclaimer, the term of this patent is extended or adjusted under 35 U.S.C. 154(b) by 415 days.

(21) Appl. No.: 15/183,707

(22) Filed: Jun. 15, 2016

(65) Prior Publication Data

US 2017/0360005 A1   Dec. 21, 2017

(51) Int. Cl.
*A01K 15/02* (2006.01)

(52) U.S. Cl.
CPC .................................. *A01K 15/026* (2013.01)

(58) Field of Classification Search
CPC ...... A01K 15/00; A01K 15/02; A01K 15/025; A01K 15/026; A63H 3/28; A63H 3/31; A63H 5/00; A63H 3/04
USPC .......... 119/702, 707, 709; 446/184, 81, 297, 446/193, 195
See application file for complete search history.

(56) References Cited

U.S. PATENT DOCUMENTS

| | | | | |
|---|---|---|---|---|
| 2,224,456 A * | 12/1940 | Janas | ...................... | A63H 3/04 446/300 |
| 2,620,593 A * | 12/1952 | Rockwood | ............. | A63H 15/06 446/193 |
| 2,817,187 A * | 12/1957 | Auzin | ..................... | A63H 3/06 446/184 |
| 2,968,121 A * | 1/1961 | Pearson, Jr. | ........... | A63H 37/00 403/166 |
| 3,032,921 A * | 5/1962 | Greene | .................... | A63H 3/48 446/190 |
| 3,900,993 A * | 8/1975 | Betters | ................ | A01M 31/004 446/193 |
| 4,034,499 A * | 7/1977 | Wild | ........................ | A63H 5/00 446/215 |
| 4,114,501 A * | 9/1978 | Tanaka | ..................... | A63H 5/00 446/193 |
| 5,162,012 A * | 11/1992 | Blandi | ..................... | A63H 3/28 40/455 |
| 5,310,380 A * | 5/1994 | Levy | ........................ | A63H 3/36 446/320 |
| 5,571,037 A * | 11/1996 | Sellers | ..................... | A63H 5/00 446/188 |

(Continued)

*Primary Examiner* — Christopher D Hutchens
(74) *Attorney, Agent, or Firm* — Tommy S F Wang; Wang IP Law Group, P.C.

(57) ABSTRACT

An animated squeaky pet toy provides an animated, chewable pet toy that emits a squeaky sound when compressed from multiple directions and pressures due to an alternating pattern of accordion and bulbous sections. An elongated compressible inner chamber provides a generally elongated body portion having an alternating pattern of at least one accordion section and at least one bulbous section. The accordion section includes multiple folds that produce air flow when pulled or compressed laterally. The bulbous section increases the diameter of the body portion, and can be compressed axially and diagonally to produce air flow. The compressible inner chamber includes a pair of ends having an aperture. A reed passes through each aperture. The reed vibrates to produce a squeaky sound when air flow passes through either aperture. An animated outer chamber encapsulates the compressible inner chamber to transfer compressive forces to the body portion of compressible inner chamber.

14 Claims, 6 Drawing Sheets

(56) References Cited

U.S. PATENT DOCUMENTS

| | | | | |
|---|---|---|---|---|
| 5,928,055 | A * | 7/1999 | Gramsch | A63H 15/08 446/297 |
| 6,422,912 | B1 * | 7/2002 | Summers | A61L 9/12 446/176 |
| 7,642,438 | B1 * | 1/2010 | Cohen | G10K 9/04 446/184 |
| 2002/0134318 | A1 * | 9/2002 | Mann | A01K 15/026 119/709 |
| 2012/0090554 | A1 * | 4/2012 | Nunn | A01K 15/025 119/707 |
| 2012/0137985 | A1 * | 6/2012 | Hansen | A01K 15/025 119/707 |
| 2012/0272922 | A1 * | 11/2012 | Axelrod | A01K 15/026 119/709 |
| 2013/0097901 | A1 * | 4/2013 | Cooper | A01K 15/026 40/299.01 |
| 2014/0230751 | A1 * | 8/2014 | Lamprey, Jr. | A01K 15/025 119/707 |
| 2015/0237829 | A1 * | 8/2015 | Tsengas | A01K 15/025 119/709 |
| 2015/0289482 | A1 * | 10/2015 | Nunn | A01K 15/025 119/709 |
| 2017/0094943 | A1 * | 4/2017 | Wilson | A01K 15/025 |

* cited by examiner

ANIMATED SQUEAKY PET TOY AND METHOD FOR PRODUCING A SQUEAKY NOISE

FIELD OF THE INVENTION

The present invention relates generally to an animated squeaky pet toy and method for producing a squeaky noise. More so, the present invention relates to a chewable and/or compressible pet toy comprised of an elongated compressible inner chamber defined by a pair of ends having an aperture with a reed passing through that vibrates to produce a squeaky sound when air passes through, a body portion that alternates between at least one accordion section and at least one bulbous section that enable squeezing from multiple directions, such being pulled along both ends, pushed from both ends, or squeezed from anywhere, to produce air that passes through the reeds; whereby the animated squeaky toy further comprises an animated outer chamber that encapsulates the compressible inner chamber, forming an attractive ornamentation and ensuring that the compressible inner chamber remains protected from chewing by the pet.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a chew toy is a toy designed to be chewed by pets for purposes of stimulation and relief from boredom. Chew toys are commonly associated with puppies and dogs, though they are also used for birds, rodents, and rabbits. The act of gnawing on a chew toy is meant to be soothing and to assist small animals, like puppies, in event of easing the pain when breaking in their adult teeth as the chewing process releases feel-good chemicals from the brain. In the art, several types of chew toys are known. These may include materials made of rawhide, wood, paper and mineral.

Generally, chew toys are beneficial for pets, providing mastication exercise as well as dental sanitation. Such toys have also been known to include devices that emit sound when the pet chews on or otherwise squeezes the toy due to the compression of air through the devices. These devices, typically known as "squeakers," are usually made of reeds or other similar devices that vibrate when air is compressed through them, with the vibration emitting a sound the animal finds attractive.

One type of squeaker is that arranged within an aperture of a compressible plastic chamber, which forces air through the squeaker when the chamber is compressed. In most compressible sound-emitting pet toys, the squeaker and squeaker chambers are generally confined to a limited region of the toy.

In many instances, the compressive forces by the jaw of the pet damage the chew toy. Thus, the chew toys break very quickly under normal play conditions. The squeaker is especially susceptible to damage, being either part of the mold or attached to the single wall mold. In either case, when the outside wall gets punctured or the squeaker gets chewed or crushed, the chew toy stops making noise. Once the squeaker is broken, the chew toy loses appeal. The second issue is, to get good sound, the wall of the chew toy has to be pliable. The issue with this is the toy can easily be punctured or torn again eliminating the appeal for the pet and causing the play area to require cleaning once the toy is shredded.

Other proposals have involved squeaky chew toys for pets. The problem with these chew toys is that they do not provide a squeaky sound when compressed from any direction. Also, the reed that produces the squeaky sound is often damaged due to the compressive forces by the jaw of the animal. Even though the above cited chew toys meets some of the needs of the market, a an animated, chewable pet toy that emits a squeaky sound when compressed or pulled from multiple directions and pressures due to an alternating pattern of accordion and bulbous sections is still desired.

SUMMARY

Illustrative embodiments of the disclosure are generally directed to an animated squeaky pet toy and method for producing a squeaky noise. The animated squeaky pet toy, hereafter "toy", is a compressible and/or chewable pet toy that emits a squeaking sound when compressed from multiple directions and pressures due to a unique alternating pattern of accordion and bulbous sections, while also protecting the mechanism that produces the squeaky sound, and also having an animated configuration that enhances the entertainment value for the pet through variously colored and shaped figurines.

Specifically novel to the present disclosure is that the toy produces a squeaky noise by pulling or pushing the on opposite ends in a longitudinal motion. Those skilled in the art will recognize that traditional squeakers only produce the squeaky noise when the squeaker's chamber body is depressed axially or diagonally. However, this disclosure produces the squeaky noise without the need to axially depress the chamber body, due to a unique alternating pattern of accordion sections and bulbous sections, as described below.

In one embodiment, the toy comprises an elongated compressible inner chamber. The compressible inner chamber is sufficiently resilient, so as to be easily compressed from multiple directions and at multiple pressures, so as to produce air flow that produces a squeaky sound. The compressible inner chamber is defined by a generally elongated body portion that follows an alternating pattern of at least one accordion section and at least one bulbous section.

The accordion section includes multiple folds that increase the surface area of the compressible inner chamber, and thereby increases the amount of air that is produced in the compressible inner chamber upon compression. The multiple folds of the accordion section may be compressed or pulled laterally to produce the air flow. Thus, the accordion section produces air flow when it is compressed or pulled laterally, without requiring either axial or diagonal compression to produce air flow.

The bulbous section of the body portion increases the diameter of the body portion, creating a larger area of the body portion that can be compressed. This results in an increase in the amount of air that is produced in the compressible inner chamber. The protruding configuration of the bulbous section can be compressed axially and diagonally to produce the air flow.

Due to the variances in shape and dimension between the accordion section and the bulbous section, the compressible inner chamber can produce air flow when squeezed from multiple directions, such being pulled outwardly lengthwise, compressed inwardly, compressed from a top and bottom, or squeezed from a diagonal angle. The myriad compressions that can be applied to the accordion and bulbous sections also allow for lesser pressure to be applied for producing air flow. It is significant to note that the compressible inner chamber also produces the squeaky noise when the compressible inner chamber is held at one end and shaken. However, a squeaky noise is produced only when the shaking motion reaches a predetermined motion velocity.

The compressible inner chamber is further defined by a pair of ends having a first aperture and a second aperture. A first reed and a second reed pass through their respective apertures. The reeds vibrates to produce a squeaky sound when air flow passes through either of the apertures. As described above, due to the compressive and pulling forces on the accordion and bulbous sections of the body portion, the air flow passes through the apertures.

The toy further comprises an animated outer chamber that encapsulates the compressible inner chamber. The animated outer chamber is sufficiently resilient to transfer compressive forces, i.e. chewing by a pet, to the body portion of the compressible inner chamber.

Thus, when the pet chews on the animated outer chamber from any direction and with any minimal amount of pressure, the compressible inner chamber is compressed or pulled simultaneously in multiple directions to produces air flow. The animated outer chamber may be fabricated from a resilient and durable polymer or rubber material that is efficacious for this purpose. Furthermore, the squeaky sound easily passes through the generally pliable surface of the animated outer chamber. The animated outer chamber may also include an air release hole to enable the air flow produced by the compressible inner chamber to be released.

The animated outer chamber, while resilient, is also sufficiently durable to ensure that the compressible inner chamber remains protected from chewing by the pet. In this manner, the pet does not damage the reed or other components of the compressible inner chamber. The pet is also protected from choking on the smaller compressible inner chamber. In one embodiment, the animated outer chamber contains a filler medium that retains the compressible inner chamber in a set position inside the animated outer chamber.

Further, the animated outer chamber forms an attractive ornamentation that is visible to the pet. The animated outer chamber may include a plush figure that has animated features to further enhance the entertainment and enjoyment for the pet.

In one aspect, an animated squeaky toy, comprises:
a compressible inner chamber defined by a body portion, the body portion comprising an alternating pattern of at least one accordion section having a plurality of folds, whereby compressing or pulling the accordion section laterally produces an air flow,
the body portion further comprising at least one bulbous section configured to increase the diameter of the body portion, whereby compressing the bulbous section axially and diagonally produces the air flow,
the compressible inner chamber further defined by a pair of ends comprising an aperture at each end,
whereby at least a portion of the air flow produced by the body portion passes through the aperture;
at least one reed disposed to at least partially extend through the aperture, the at least one reed configured to vibrate when the air flow passes through the aperture; and
an animated outer chamber defined by an animated configuration and an air release hole, the animated outer chamber configured to encapsulate the compressible inner chamber, the animated outer chamber further configured to transfer compressive forces to the body portion of the compressible inner chamber.

In another aspect, the compressible inner chamber is a resilient polymer or rubber material.

In another aspect, the at least one accordion section is two, spaced-apart accordion sections.

In another aspect, the at least one bulbous section is three, spaced-apart bulbous sections.

In another aspect, the vibrating reed is configured to generate a squeaky sound.

In another aspect, the animated outer chamber is a resilient and durable polymer or rubber material.

In another aspect, the animated outer chamber is a plush toy of a monkey or a Santa Clause figure. Though in other aspects, nylon, denim, corduroy, or other materials may be used.

In another aspect, the animated outer chamber contains a filler medium that retains the compressible inner chamber in a set position inside the animated outer chamber.

In yet another aspect, a method for producing a squeaky sound with an animated squeaky toy, comprises:
providing a compressible inner chamber, the compressible inner chamber defined by a body portion, the body portion comprising an alternating pattern of at least one accordion section having a plurality of folds, the body portion further comprising at least one bulbous section configured to increase the diameter of the body portion;
providing an animated outer chamber configured to encapsulate the compressible inner chamber;
compressing the animated outer chamber;
transferring the compressive force of the animated outer chamber to the compressible inner chamber;
compressing or pulling the accordion section laterally to produce an air flow;
compressing the bulbous section axially and diagonally to produce the air flow;
passing the air flow through a reed; and
producing a squeaky noise.

One objective of the present invention is to provide a pet toy designed to be chewed by pets for purposes of stimulation and relief from boredom.

Another objective is to provide a pet toy that can be chewed from multiple directions and with multiple pressures to produce a squeaky sound.

Another objective is to provide a pet toy in which the reed that produces the squeaky sound is protected from dislodgement caused by attack by the pet.

Yet another objective is to provide a pet toy which is durable.

Yet another objective is to provide a pet toy which has a long term functioning reed.

Yet another objective is to provide a pet toy having animated features that entertain a pet.

Yet another objective is to provide a pet toy which is capable of being manufactured of high quality and at a low cost, and which is capable of providing a long and useful life with a minimum of maintenance.

It is also significant to note that each end of the compressible inner chamber may further include at least one ring that can be used for fastening or mounting the compressible inner chamber. The ring may also be used for securing the ends of the compressible inner chamber to the animated outer chamber, so when the body portion is pulled, the ring helps to pull the accordion section of the body portion, thus making the squeaky noise.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An animated squeaky pet toy 100 and method 200 for producing a squeaky noise is referenced in FIGS. 1-6. The animated squeaky pet toy 100, hereafter "toy 100", is a compressible and/or chewable pet toy that emits a squeaky sound when compressed from multiple directions and pressures due to a unique alternating pattern of accordion and bulbous sections 112*a-b*, 114*a-c*, while also protecting the accordion and bulbous sections that produces the squeaky sound.

Specifically novel to the present disclosure is that the toy 100 produces a squeaky noise by pulling or pushing its on opposite ends in a longitudinal motion. Those skilled in the art will recognize that traditional squeakers only produce the squeaky noise when the squeaker's chamber body is depressed. However, this disclosure produces the squeaky noise without the need to depress the chamber body, due to a unique alternating pattern of accordion and bulbous sections 112*a-b*, 114*a-c*, as described below. Further, the toy 100 provides a protective, animated configuration that protects the accordion and bulbous sections, while also enhancing the entertainment value for the pet through variously colored and shaped figurines.

Figure 1:
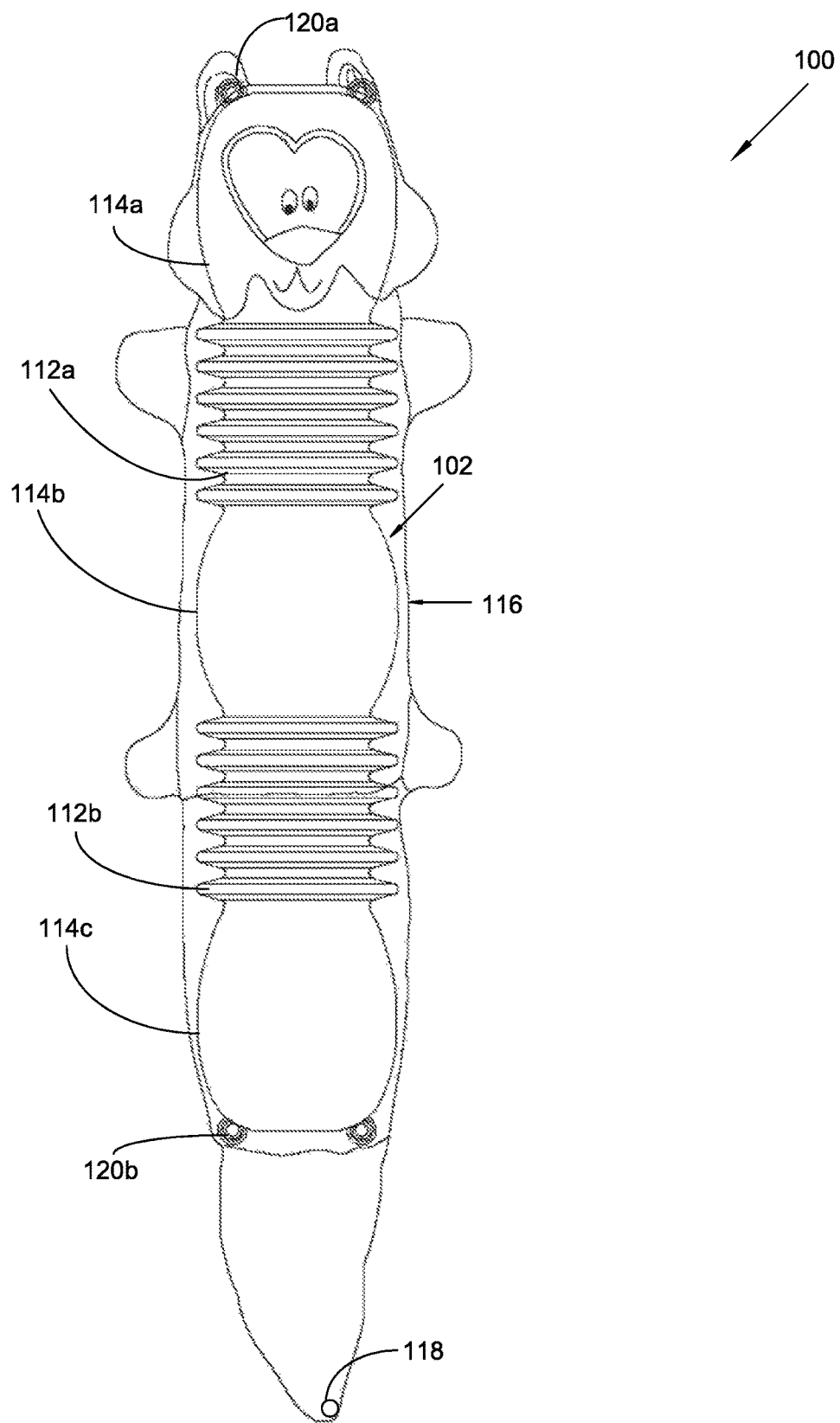
FIG. 1 illustrates a sectioned view of an exemplary animated squeaky toy, showing an animated outer chamber encapsulating a compressible inner chamber, in accordance with an embodiment of the present invention.

As referenced in FIG. 1, the toy 100 comprises an elongated compressible inner chamber 102. The compressible inner chamber 102 is sufficiently resilient, so as to be easily compressed from multiple directions and at multiple pressures, so as to produce air flow that produces a squeaky sound. In one embodiment, the compressible inner chamber 102 is a resilient polymer or rubber material. The compressible inner chamber 102 may also be transparent.

Figure 2:
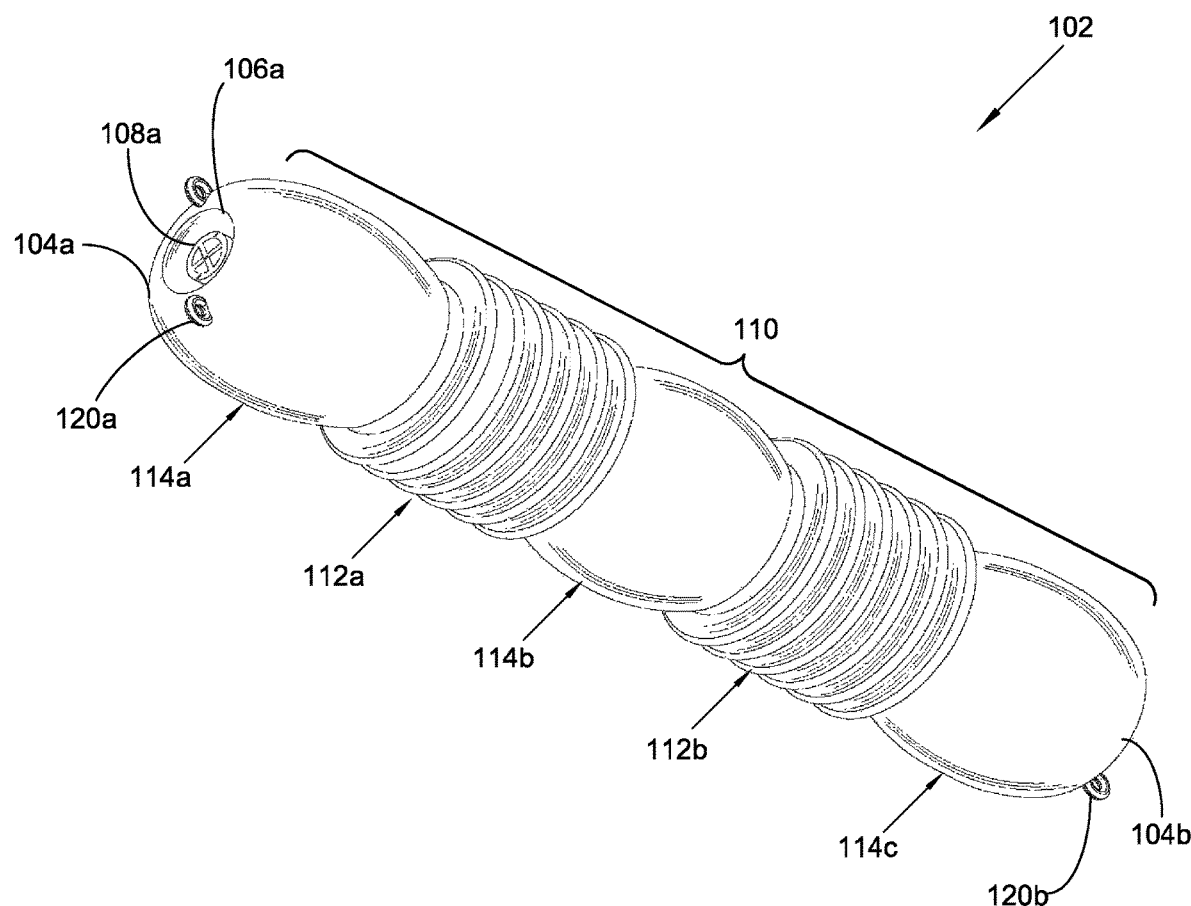
FIG. 2 illustrates a perspective view of an exemplary compressible inner chamber of an animated squeaky toy, in accordance with an embodiment of the present invention.

Turning now to FIG. 2, the compressible inner chamber 102 may be defined by a generally elongated body portion 110 that follows an alternating pattern of at least one accordion section 112*a*, 112*b* and at least one bulbous section 114*a*, 114*b*, 114*c*. The accordion section 112*a*, 112*b* includes multiple folds that increase the surface area of the compressible inner chamber 102, and thereby increases the amount of air that is produced in the compressible inner chamber 102 upon compression. The multiple folds of the accordion section 112*a*, 112*b* may be compressed or pulled laterally to produce the air flow. Thus, the accordion section 112*a*, 112*b* produces air flow when it is compressed or pulled laterally, without requiring either axial or diagonal compression to produce air flow. In one embodiment, the body portion 110 has two, spaced-apart accordion section 112*a*, 112*b*s.

Figure 3:
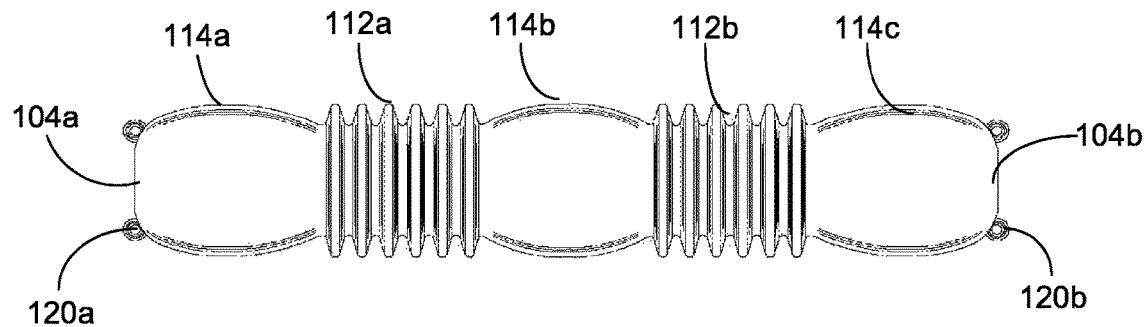
FIG. 3 illustrates an elevated left side view of a compressible inner chamber of an animated squeaky toy, in accordance with an embodiment of the present invention.
Figure 4:
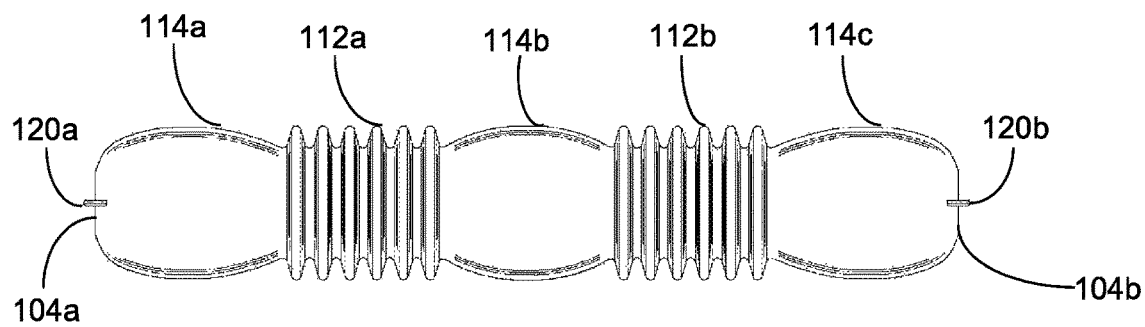
FIG. 4 illustrates an elevated right side view of a compressible inner chamber of an animated squeaky toy, in accordance with an embodiment of the present invention.

As the side views of FIGS. 3 and 4 illustrate, the bulbous section 114*a*, 114*b*, 114*c* of the body portion 110 increases the diameter of the body portion 110, creating a larger area of the body portion 110 that can be compressed. This results in an increase in the amount of air that is produced in the compressible inner chamber 102. The protruding configuration of the bulbous section 114*a*, 114*b*, 114*c* can be compressed axially and diagonally to produce the air flow. In one embodiment, the body portion 110 has three, spaced-apart bulbous sections 114*a*, 114*b*, 114*c*.

Due to the variances in shape and dimension between the accordion section 112*a*, 112*b* and the bulbous section 114*a*, 114*b*, 114*c*, the compressible inner chamber 102 can produce air flow when squeezed from multiple directions, such being pulled outwardly length-wise, compressed inwardly, compressed from a top and bottom, or squeezed from a diagonal angle. The myriad compressions that can be applied to the accordion and bulbous section 114*a*, 114*b*, 114*cs* also allow for lesser pressure to be applied for producing air flow, and thereby producing the squeaky noise.

Figure 5:
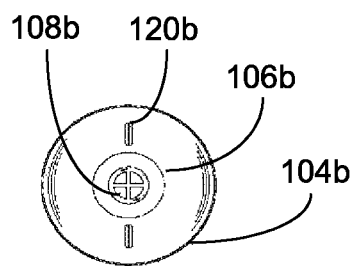
FIG. 5 illustrates an end view of a compressible inner chamber of an animated squeaky toy, in accordance with an embodiment of the present invention.

Looking now at the end view of FIG. 5, the compressible inner chamber 102 is further defined by a pair of ends 104*a*, 104*b* having an aperture 106*a*, 106*b* at each end 104*a*, 104*b*. At least one reed 108*a*, 108*b* passes through the respective aperture 106*a*, 106*b*. The reed 108*a*, 108*b* vibrates to produce a squeaky sound when air flow passes through either of the apertures 106*a*, 106*b*. In one embodiment, the reed 108*a*, 108*b* is a thin strip of material which vibrates to produce the squeaky sound.

As described above, due to the compressive and pulling forces on the accordion and bulbous section 112*a*, 112*b*, 114*a*, 114*b*, 114*cs* of the body portion 110, the air flow passes through the apertures 106*a*, 106*b* and over the reeds 108*a*, 108*b*. This is what produces the squeaky noise. Each end 104*a*, 104*b* of the compressible inner chamber 102 may further include at least one ring 120*a*, 120*b* that can be used for fastening or mounting the compressible inner chamber 102.

It is also significant to note that the at least one ring 120*a*, 120*b* at each end of the compressible inner chamber 102 may be used for fastening or mounting the compressible inner chamber 102. The ring 120*a*, 120*b* may also be used for securing the ends of the compressible inner chamber 102 to an animated outer chamber 116, so when the body portion 110 is pulled, the ring helps to pull the accordion section 112*a*, 112*b* of the body portion 110, thus making the squeaky noise.

Looking back at FIG. 1, the toy 100 further comprises an animated outer chamber 116 that encapsulates the compressible inner chamber 102. The animated outer chamber 116 is sufficiently resilient to transfer compressive forces, i.e. chewing by a pet, to the body portion 110 of the compressible inner chamber 102. Thus, when the pet chews on the animated outer chamber 116 from any direction and with any minimal amount of pressure, the compressible inner chamber 102 is compressed or pulled simultaneously in multiple directions to produces air flow. The animated outer chamber 116 may be fabricated from a resilient and durable polymer or rubber material that is efficacious for this purpose.

An air release hole 118 may be formed in the animated outer chamber 116. The air release hole 118 enables the air flow produced by the compressible inner chamber 102 to be released. The air release hole 118 also serves as a speaker to allow the squeaky noise to pass through the animated outer chamber 116.

Those skilled in the art will recognize that without the air release hole 118, excessive pressure buildup may occur in the animated outer chamber 116. Furthermore, the generally pliable surface of the animated outer chamber 116 enables the squeaky sound generated by the reed 108*a*, 108*b* to easily pass through the surface of the animated outer chamber 116 and the air release hole 118.

The animated outer chamber 116, while resilient, is also sufficiently durable to ensure that the compressible inner chamber 102 remains protected from chewing by the pet. In this manner, the pet does not damage the reed or other components of the compressible inner chamber 102. The pet is also protected from choking on the smaller compressible inner chamber 102. In one embodiment, the animated outer chamber 116 contains a filler medium (not shown) that retains the compressible inner chamber 102 in a set position inside the animated outer chamber 116. The filler material may include a resilient fabric, multiple flexible bars, and a gel.

Further, the animated outer chamber 116 forms an attractive ornamentation that is visible to the pet. The animated outer chamber 116 may include a plush figure that has animated features, various colors, and unique shapes to further enhance the entertainment and enjoyment for the pet. Suitable figures for the animated outer chamber 116 may include, without limitation, a monkey, a Santa Clause, a monster, and a tree. Though in some embodiments, any animated or ornamental configuration may be used.

Figure 6:
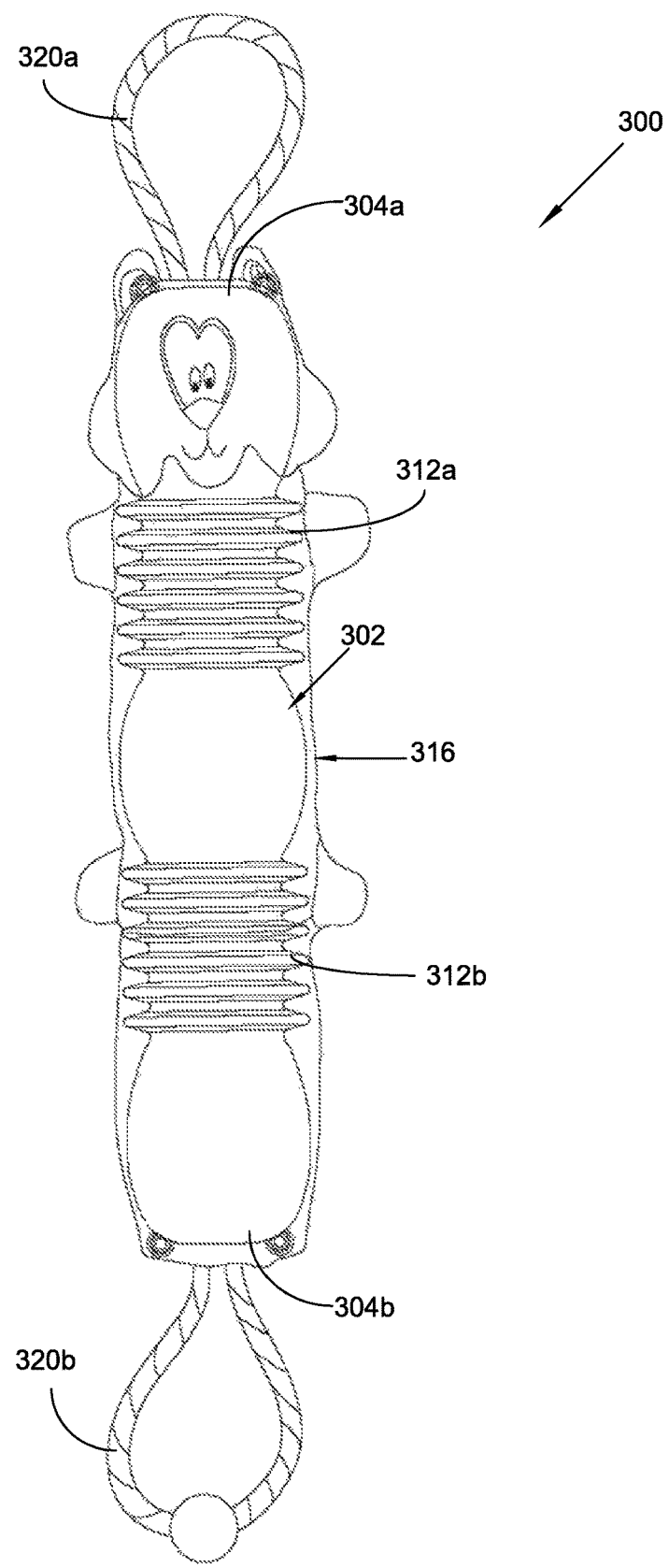
FIG. 6 illustrates a sectioned view of an alternative animated squeaky toy, showing at least one pull-string, in accordance with an embodiment of the present invention.

FIG. 6 illustrates a sectioned view of an alternative animated squeaky toy 300, showing at least one pull-string 320*a*, 320*b* used to both grasp the toy 300, and also to laterally pull a compressible inner chamber 302, such that an accordion section 312*a*, 312*b* is laterally displaced to produce an air flow. In this manner, the squeaky noise may be actuated by pulling at the pull-string 320*a*, 320*b*. The pull-string 320*a*, 320*b* may be positioned at the ends 304*a*, 304*b* of the compressible inner chamber 302 to most efficiently achieve the gripping and lateral pulling functions. In yet another alternative embodiment, a hook or a bungee rope may be used in place of the pull-string 320*a*, 320*b*.

Figure 7:
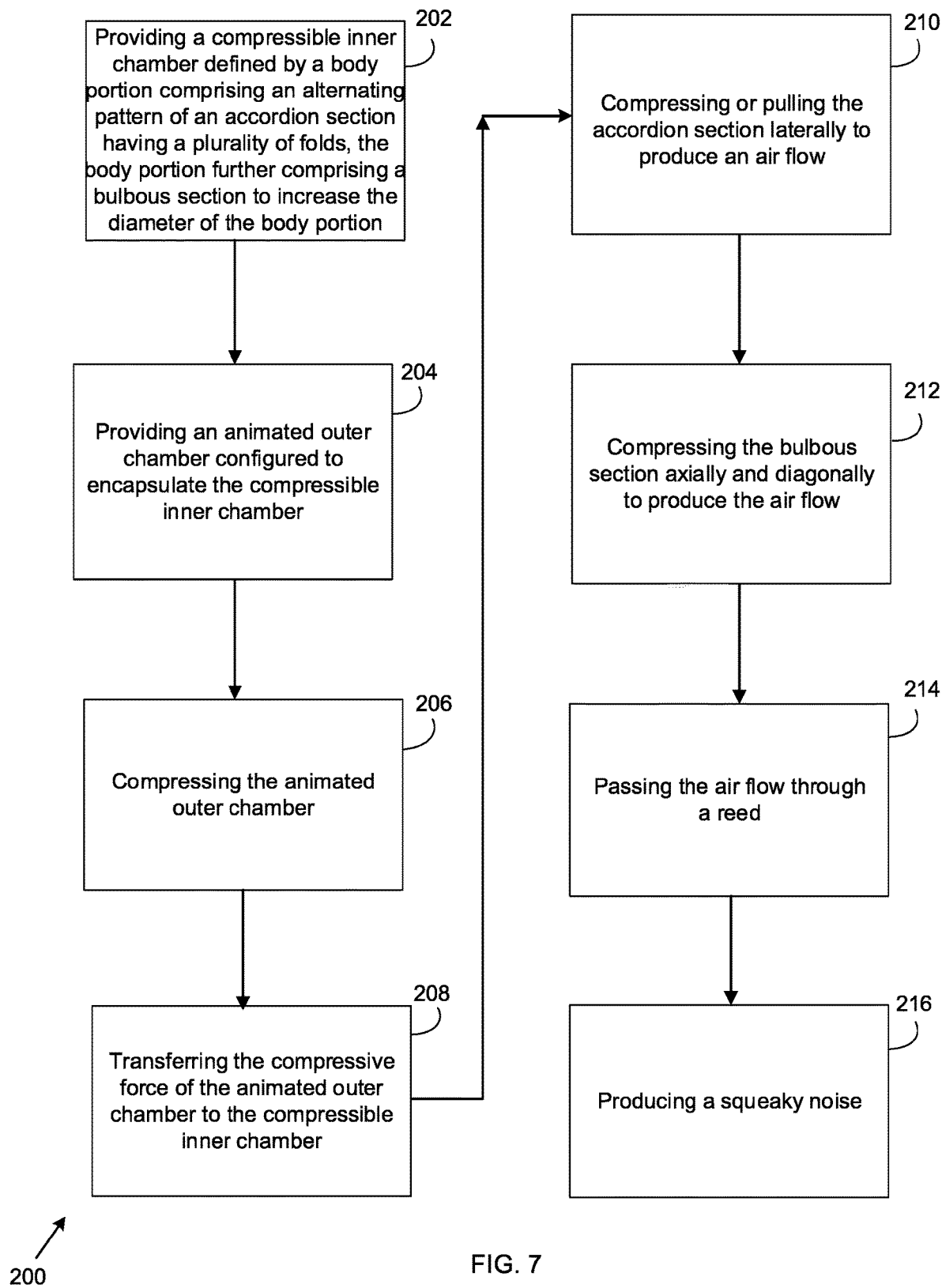
FIG. 7 illustrates a flowchart diagram of an exemplary method for producing a squeaky sound with an animated squeaky toy, in accordance with an embodiment of the present invention.

As illustrated in the flowchart of FIG. 7, a method 200 for producing a squeaky sound with an animated squeaky toy 100 produces a squeaking sound when compressed from multiple directions and pressures due to a unique alternating pattern of accordion and bulbous section 114*a*, 114*b*, 114*cs*, while also protecting the accordion and bulbous section 114*a*, 114*b*, 114*cs* that produces the squeaky sound.

The method 200 may include an initial Step of providing a compressible inner chamber 102, the compressible inner chamber 102 defined by a body portion 110, the body portion 110 comprising an alternating pattern of at least one accordion section 112*a*, 112*b* having a plurality of folds, the body portion 110 further comprising at least one bulbous section 114*a*, 114*b*, 114*c* configured to increase the diameter of the body portion 110.

The method 200 may further comprise a Step 204 of providing an animated outer chamber 116 configured to encapsulate the compressible inner chamber 102. The animated outer chamber 116 encapsulates the compressible inner chamber 102. The animated outer chamber 116 forms an attractive ornamentation that is visible to the pet.

In some embodiments, a Step 206 includes compressing the animated outer chamber 116. A Step 208 comprises transferring the compressive force of the animated outer chamber 116 to the compressible inner chamber 102. The animated outer chamber 116 is sufficiently resilient to transfer compressive forces, i.e. chewing by a pet, to the body portion 110 of the compressible inner chamber 102.

A Step 210 includes compressing or pulling the accordion section 112*a*, 112*b* laterally to produce an air flow. The accordion section 112*a*, 112*b* includes multiple folds that increase the surface area of the compressible inner chamber 102, and thereby increases the amount of air that is produced in the compressible inner chamber 102 upon compression. The multiple folds of the accordion section 112*a*, 112*b* may be compressed or pulled laterally to produce the air flow.

In some embodiments, a Step 212 may include compressing the bulbous section 114*a*, 114*b*, 114*c* axially and diagonally to produce the air flow. The protruding configuration of the bulbous section 114*a*, 114*b*, 114*c* can be compressed axially and diagonally to produce the air flow.

A Step 214 comprises passing the air flow through a reed 108*a*, 108*b*. The compressible inner chamber 102 is defined by a pair of ends 104a, 104b having an aperture 106a, 106b at each end. At least one reed 108a, 108b passes through the respective aperture 106a, 106b. The reed 108a, 108b vibrates to produce a squeaky sound when air flow passes through either of the apertures 106a, 106b. A final Step 216 includes producing a squeaky noise. This is accomplished as the air flow vibrates the reed 108a, 108b.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An animated squeaky toy, the toy comprising:
a compressible inner chamber defined by a body portion, the body portion comprising an alternating pattern of two spaced-apart accordion sections having a plurality of folds, whereby compressing or pulling the accordion sections laterally produces an air flow,
the body portion further comprising three spaced-apart bulbous sections configured to increase the diameter of the body portion, whereby compressing the bulbous sections axially and diagonally produces the air flow, wherein a length of the bulbous section is greater than a length of the accordion section,
the compressible inner chamber further defined by a pair of ends comprising an aperture at each end,
whereby at least a portion of the air flow produced by the body portion passes through the apertures;
two reeds disposed to at least partially extend through the apertures, the reeds configured to vibrate when the air flow passes through the apertures; and
an animated outer chamber defined by an animated configuration, the animated outer chamber configured to encapsulate the compressible inner chamber, the animated outer chamber further configured to transfer compressive forces to the body portion of the compressible inner chamber.

2. The toy of claim 1, wherein the compressible inner chamber is plastic.

3. The toy of claim 1, wherein the body portion generally elongated.

4. The toy of claim 1, wherein the vibration of the reeds are configured to generate a squeaky sound.

5. The toy of claim 1, wherein the animated outer chamber is a plush toy of a monkey or a Santa Clause figure.

6. The toy of claim 1, wherein the animated outer chamber comprises an air release hole.

7. The toy of claim 1, further including at least one pull-string disposed at the pair of ends of the compressible inner chamber.

8. An animated squeaky toy, the toy comprising:
a compressible inner chamber defined by a body portion, the body portion comprising, an alternating pattern of two spaced-apart accordion sections having a plurality of folds, whereby compressing or pulling the accordion sections laterally produces an air flow,
the body portion further comprising three spaced-apart bulbous sections configured to increase the diameter of the body portion, whereby compressing the bulbous sections axially and diagonally produces the air flow, wherein a length of the bulbous section is greater than a length of the accordion section,
the compressible inner chamber further defined by a pair of ends comprising an aperture at each end,
whereby at least a portion of the air flow produced by the body portion passes through the apertures; and
two reeds disposed to at least partially extend through the apertures, the reeds configured to vibrate when the air flow passes through the apertures.

9. The toy of claim 8 further comprising an animated outer chamber.

10. The toy of claim 9, wherein the animated outer chamber is defined by an animated configuration and an air release hole, the animated outer chamber configured to encapsulate the compressible inner chamber, the animated outer chamber further configured to transfer compressive forces to the body portion of the compressible inner chamber.

11. The toy of claim 10, wherein the animated outer chamber is a plush toy of a monkey or a Santa Clause figure.

12. The toy of claim 8, wherein the body portion is generally elongated.

13. The toy of claim 8, wherein the vibrating reeds are configured to generate a squeaky sound.

14. A method for producing a squeaky sound with an animated squeaky toy, the method comprising:
providing a compressible inner chamber, the compressible inner chamber defined by a body portion, the body portion comprising an alternating pattern of two spaced-apart accordion sections having a plurality of folds, the body portion further comprising three spaced-apart bulbous sections configured to increase the diameter of the body portion, herein a length of the bulbous section is greater than a length of the accordion section;
providing an animated outer chamber configured to encapsulate the compressible inner chamber;
compressing the animated outer chamber;
transferring the compressive force of the animated outer chamber to the compressible inner chamber;
compressing or pulling at least one of the accordion section laterally to produce an air flow;
compressing at least one of the bulbous section axially and diagonally to produce the air flow;
passing the air flow through a reed; and
producing a squeaky noise.

\* \* \* \* \*